United States Patent [19]

Donnert et al.

[11] 4,230,565

[45] Oct. 28, 1980

[54] METHOD FOR PURIFYING PHOSPHATE CONTAINING WASTE WATERS

[75] Inventors: Dietfried Donnert, Karlsruhe; Siegfried Eberle, Eggenstein-Leopoldshafen, both of Fed. Rep. of Germany

[73] Assignee: Kernforschungszentrum Karlsruhe, GmbH, Karlsruhe, Fed. Rep. of Germany

[21] Appl. No.: 904,991

[22] Filed: May 11, 1978

[30] Foreign Application Priority Data

May 12, 1977 [DE] Fed. Rep. of Germany ....... 2721298

[51] Int. Cl.$^2$ .............................................. C02B 1/14
[52] U.S. Cl. .................................................. 210/683
[58] Field of Search ....... 210/20, 37 R, 274, DIG. 29, 210/33, 49; 422/224, 225, 231

[56] References Cited

U.S. PATENT DOCUMENTS

| 3,754,993 | 8/1973 | Oguchi et al. .......................... 210/20 |
| 3,759,669 | 9/1973 | Aaron et al. .......................... 422/231 |
| 4,046,683 | 9/1977 | Tsunoda et al. ............. 210/DIG. 29 |
| 4,080,290 | 3/1978 | Kläntschi et al. .................. 210/37 R |

FOREIGN PATENT DOCUMENTS

2320799  11/1974  Fed. Rep. of Germany.

OTHER PUBLICATIONS

Ploetz, T., *Das Papier*, vol. 28, Oct. 1974, pp. 1–5.
Shiao, et al., *Journal WPCF*, Feb. 1977, pp. 280–285.

*Primary Examiner*—Ivars C. Cintins
*Attorney, Agent, or Firm*—Spencer & Kaye

[57] ABSTRACT

Process for purifying phosphate containing waste waters in which aluminum oxide is used as the sorption material. The waste water is brought into contact with fine-grained aluminum oxide in a grain size range from 0.05 to 0.2 mm. Simultaneously, a gas is blown in, which is inert with respect to $Al_2O_3$ and with respect to phosphate ions.

6 Claims, No Drawings

METHOD FOR PURIFYING PHOSPHATE CONTAINING WASTE WATERS

BACKGROUND OF THE INVENTION

The present invention relates to a method for purifying phosphate containing waste waters in which aluminum oxide is used as the sorption material.

For the removal of phosphates from waste waters, for example, from waste discharges from biological clarification systems, the prior art practice has been flocculation with iron or aluminum salts. A drawback of the flocculation process is that there is a great consumption of salts and possibly of means or agents which aid flocculation. Moreover, in the flocculation process, a large quantity of mud or sludge is produced which must be disposed of. Possible recovery of the phosphates from these muds has not as yet been effected and is very costly because of the relatively low concentration in the mud.

There are literature references which indicate that phosphate ions are sorbed by aluminum oxide. Two process principles have become known in this connection.

In the first process, the percolation of the waste water is effected through a column filled with coarse $Al_2O_3$ grains, for example, grain sizes of from 1 to 5 mm. In the second process, a fluidized bed is used with fine-grained $Al_2O_3$ having grain sizes of, for example, 0.05 to 0.2 mm.

These methods which employ aluminum oxide so far have not as yet been used, other than in laboratories, and have a number of drawbacks. With respect to the first process principle where use is made of a fixed bed, the columns are clogged very quickly due to the development of mud. The columns must therefore be rinsed out very often. Moreover, abrasion of the coarse grained $Al_2O_3$ produces relatively heavy losses. With respect to the second process principle where use is made of a fluidized bed, the mode of operation of fluidized bed reactors is very irregular. Further, it happens that unpurified or incompletely purified water breaks through and so-called bubble formation takes place. In addition, the adsorption kinetics in the fluidized bed are very poor due to great film thicknesses of the materials to be removed at the individual grains of the sorption agent. Moreover, the start of operation after shut-down in a fluidized bed is very difficult since the fine-grained $Al_2O_3$ cakes together when settling and renewed fine distribution is very difficult.

SUMMARY OF THE INVENTION

It is therefore a primary object of the present invention to provide a process with which phosphate containing waste waters can be freed of the phosphates while avoiding the drawbacks of the known processes.

A further object of the present invention is to provide a process which is safe and continuous, as well as discontinuous, while employing a sorption agent that can easily be desorbed again.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention, as embodied and broadly described, provides a process for purifying a phosphate containing waste water in which aluminum oxide is used as the sorption material, comprising: bringing the waste water into contact with fine-grained aluminum oxide having a grain size range from 0.05 to 0.2 mm, and simultaneously blowing in a gas which is inert with respect to $Al_2O_3$ and with respect to phosphate ions.

It is to be understood that both the foregoing general description and the following detailed description are exemplary, but are not restrictive of the invention.

DETAILED DESCRIPTION OF THE PREFERRED EMBODIMENTS

In the practice of the present invention, the medium to be treated is a waste water which contains phosphates, and can, for example, be industrial waste water containing chemicals or waste water from domestic sewage and especially can be discharge from a biological clarification system.

The process of the present invention employs inexpensive finely grained aluminum oxide particles having a grain size of between 0.05 and 0.2 mm as sorption agent. Abrasion losses do not occur to any significant extent and no longer play a part in the present invention with the use of this finely grained material.

The waste water to be treated is brought into contact with the finely grained aluminum oxide, and simultaneously a gas is blown in which is inert with respect to $Al_2O_3$ and with respect to phosphate ions.

Advantageously, the inert gas is air. Preferably, the air is blown in with a flow rate in the range between 1 and 10 liters of air per liter of waste water being treated. The process according to the present invention can also be used successfully, however, with nitrogen, or carbon dioxide, or oxygen as the inert gas. The same flow rate ranges as for air are used in such cases.

By blowing in air or the above-mentioned gases, an additional purification effect occurs which is unexpected with the use of aluminum oxide. Moreover, the aluminum oxide sorption agent can be charged higher.

The phosphate loading of the $Al_2O_3$ is increased by bubbling air or other gases through the suspension of the waste water and the oxide according to the invention. On the other hand the phosphate concentration of the purified water is decreased compared with experiments done without bubbling gases.

The process of this invention can be either continuous or discontinuous, with reference to the contact of the $Al_2O_3$ with the waste water. From the point of view of the apparatus, this can be handled in two ways: either a certain amount of the oxide is contacted with the water until exhaustion and then replaced by fresh $Al_2O_3$ or the $Al_2O_3$ is fed in counter current stream to the waste water.

The advantages of the process according to the present invention compared to purification effected without aeration can be seen in that the same discharge quality of the water is attained in the process of the present invention with a smaller quantity of $Al_2O_3$ since purification in the present invention is more uniform in the stirrer reactor in which the process is conducted and the sorption agent is able to accept about twice or three times the phosphate quantity as a result of the aeration.

The difference between the stirrer reactor system and the fluidized bed system lies in the fact that in the latter the state of suspension of the solid oxide is caused by flowing in of the waste water whereas in the former it is effected by using stirrers. The particles of the oxide are agitated in the whole reactor volume independent on the material density and leads to a better adsorption kinetics of the phosphate on the oxide. In a conventional fluidized bed the technique of bubbling gases cannot be used. The application of the described technique in a fixed bed reactor was not investigated.

We conducted investigations on ortho-phosphate ($PO_4^{3-}$); di-phosphate ($P_2O_7^{4-}$); triphosphate ($P_3O_{10}^{5-}$); dibutyl-phosphate; monobutyl-phosphate; sodium poly-phosphate $(NaPO_3)_x$; calgon ($Na_{10}P_8O_{25}$, ca. 64% $P_2O_5$); secondary effluent, containing one or more of the phosphate compounds listed above.

The following examples are given by way of illustration to further explain the principles of the invention. These examples are merely illustrative and are not to be understood as limiting the scope and underlaying principles of the invention in any way. All percentages referred to herein are by weight unless otherwise indicated.

EXAMPLE 1

The discharge from a biological clarification system was introduced into a three-stage stirrer reactor system and was aerated in accordance with the present invention. In an identical parallel system, the same type of waste water was purified without aeration. Each stirrer reactor received 100 g of so-called acid aluminum oxide in a 2.5 percent by weight suspension.

A comparison of the resulting values is set forth in the following Tables 1 and 2.

TABLE 1

| Waste Water Throughput | Elimination of Phosphates as a pecentage (%) of the original phosphate content of the waste water. | |
|---|---|---|
| (Liters) | With aeration | Without aeration |
| 100 | 79 | 70 |
| 200 | 55 | 18 |
| 300 | 54 | 16 |
| 400 | 55 | 16 |
| 700 | 38 | 0 |

TABLE 2

| | Resulting charge on the $Al_2O_3$ (% P) | |
|---|---|---|
| | With aeration | Without aeration |
| Reactor 1 | 2.5 | 1.2 |
| Reactor 2 | 2.1 | 1.0 |
| Reactor 3 | 1.8 | 1.2 |

The charges were measured at the end of the experiments after a throughput of 700 liters.

The correspondance of the 4 elimination values given in table 1 and the oxide load lists above (table 2) cannot be seen exactly as the phosphate concentration of the influent was not constant, but in the range of 16.5 mg P/l to 20.4 mg P/l.

The grain size of the $Al_2O_3$ used was in the range of 0.05–0.2 mm, the flow rate of the air 10 l/h using reactors of 4.2 l volume and a throughput of 4 l/h water. Analogous experiments with the same purification effects were done with throughputs between 0.5 and 6 l/h, i.e. a contacting time between 15 minutes and 1 hour depending on the rate of suspension of the oxide reaching from 2.5 to 20% by weight of the oxide and the phosphate concentration of the inlet.

EXAMPLE 2

The procedure was the same as in Example 1, with the only exception that instead of an acid aluminum oxide, a so-called alkali $Al_2O_3$ was used which additionally had a higher specific surface than the acid $Al_2O_3$ of Example 1.

A comparison of the resulting values is set forth in the following Tables 3 and 4.

TABLE 3

| Waste Water Throughput | Elimination of Phosphates as a percentage (%) of the original phosphate content of the waste water. | |
|---|---|---|
| (Liters) | With aeration | Without aeration |
| 100 | 82 | 82 |
| 200 | 53 | 45 |
| 300 | 54 | 33 |
| 400 | 41 | 15 |
| 1000 | 42 | 0 |
| 1200 | 25 | 0 |

TABLE 4

| | Resulting charge on the $Al_2O_3$ (% P) | |
|---|---|---|
| | With aeration | Without aeration |
| Reactor 1 | 1.9 | 1.3 |
| Reactor 2 | 3.2 | 1.2 |
| Reactor 3 | 2.1 | 1.2 |

The charges were measured at the end of the experiments after a throughput of 1200 liters. The correspondance of the % elimination values given in table 3 and the oxide load listed above (table 4) cannot be seen exactly as the phosphate concentration of the influent was not constant, but in the range of 13.8 mg P/l to 19.9 mg P/l.

EXAMPLES 3 to 5

In single-stage beaker glass experiments, charges of 3 liters each of a discharge from a clarification system containing waste water with 16 mg P/l were each stirred together with 5 g aluminum oxide and gasified with a gas stream of 20 liters per hour in accordance with the present invention. Three different gases were tested, namely, $N_2$, $CO_2$, and $O_2$. Samples of treated waste water were taken at various time intervals and were analyzed to determine the percent of phosphate eliminated. A comparison experiment was conducted under identical conditions, but in which no gas was blown in. Table 5 below shows the elimination values in percent of the originally present phosphorus. The grain size of the $Al_2O_3$ used in the examples 3 to 5 was in the range between 0.05 and 0.2 mm.

TABLE 5

| Sample taken after gasification (min) | Comparison example without input of gas. % P eliminated | Example 3 Gasification with 20 l/h $N_2$. % P eliminated | Example 4 Gasification with 20 l/h $CO_2$. % P eliminated | Example 5 Gasification with 20 l/h $O_2$. % P eliminated |
|---|---|---|---|---|
| 2.5 | 38.75 | 50.0 | 43.1 | 51.25 |
| 5 | 45.6 | 56.25 | 46.9 | 59.4 |
| 10 | 45.6 | 58.1 | 50.0 | 61.9 |
| 30 | 52.5 | 59.5 | 57.5 | 65.0 |
| 40 | 56.25 | 60.6 | 61.25 | 65.0 |

TABLE 5-continued

| Sample taken after gasification (min) | Comparison example without input of gas. % P eliminated | Example 3 Gasification with 20 l/h N$_2$. % P eliminated | Example 4 Gasification with 20 l/h CO$_2$. % P eliminated | Example 5 Gasification with 20 l/h O$_2$. % P eliminated |
| --- | --- | --- | --- | --- |
| 50 | 57.5 | 61.9 | 63.75 | 65.0 |

It will be understood that the above description of the present invention is susceptible to various modifications, changes and adaptations, and the same are intended to be comprehended within the meaning and range of equivalents of the appended claims.

What is claimed is:

1. Process for purifying a phosphate containing waste water in which aluminum oxide is used as a sorption material, comprising: bringing the waste water into contact in a stirrer reactor, with stirring, with fine-grained aluminum oxide having a grain size range from 0.05 to 0.2 mm, and simultaneously blowing in a gas which is inert with respect to Al$_2$O$_3$ and phosphate ions.

2. Process as defined in claim 1 wherein the inert gas is air.

3. Process as defined in claim 2 wherein the air is blown in at a flow rate in the range between 1 and 10 liters air per liter of waste water being treated.

4. Process as defined in claim 1 wherein the inert gas is nitrogen.

5. Process as defined in claim 1 wherein the inert gas is carbon dioxide.

6. Process as defined in claim 1 wherein the inert gas is oxygen.

* * * * *